United States Patent
Ilagan

[19]

[11] Patent Number: 5,996,572
[45] Date of Patent: Dec. 7, 1999

[54] TURBO-CHARCOAL BARBECUE

[76] Inventor: Artemio M. Ilagan, P.O. Box 1815, Agana, Gambia, 96932

[21] Appl. No.: 09/313,195

[22] Filed: May 18, 1999

[51] Int. Cl.⁶ .............................. F24B 3/00; A47J 37/07
[52] U.S. Cl. .................................. 126/25 AA; 126/25 R; 126/25 B; 126/21 A; 126/30
[58] Field of Search ........................... 126/25 R, 25 AA, 126/25 B, 41 R, 3 D, 21 A, 276

[56] References Cited

U.S. PATENT DOCUMENTS

| | | | |
|---|---|---|---|
| 2,211,940 | 8/1940 | Stoner | 126/21 A |
| 2,968,301 | 1/1961 | Cowart . | |
| 3,933,145 | 1/1976 | Reich . | |
| 4,209,006 | 6/1980 | Marsalko . | |
| 4,418,615 | 12/1983 | Higgins . | |
| 4,658,710 | 4/1987 | Quet et al. . | |
| 4,773,319 | 9/1988 | Holland . | |
| 4,800,865 | 1/1989 | Setzer . | |
| 4,823,684 | 4/1989 | Traegar et al. . | |
| 5,000,085 | 3/1991 | Archer . | |
| 5,154,159 | 10/1992 | Knafelc et al. . | |

*Primary Examiner*—Carl D Price
*Attorney, Agent, or Firm*—Richard C. Litman

[57] ABSTRACT

A turbo-charcoal barbecue is designed with five main features; a detachable turbo unit, an adjustable rotisserie ensemble, a moveable charcoal tray, removable ash trays, and fire screen. The detachable turbo unit is positioned to recirculate hot air from underneath the charcoal tray and redistribute the hot air to the upper and lower areas of the grill. The turbo-charcoal barbecue includes an adjustable rotisserie ensemble. Both the turbo unit and rotisserie are driven by a 12 volt motor or from an electrical outlet using a transformer. The charcoal tray sits on a plate which is attached to a crank shaft mechanism used for raising and lowering the charcoal tray. A rectangular shaped fire screen contains small holes spaced evenly apart from each other designed to both block flash flames and allow the heat produced from the ignited briquets to flow through it. The lower chamber of the barbecue pit collects expended ash material and beneath the lower chamber are removable ash trays that collect ashes that are swept down chutes from the lower chamber.

11 Claims, 4 Drawing Sheets

TURBO-CHARCOAL BARBECUE

BACKGROUND OF THE INVENTION

1. Field of the Invention

This present invention relates to a turbo-charcoal barbecue, and is more particularly concerned with an adjustable charcoal tray, a fire screen for spreading the heat from the charcoal tray, an adjustable rotisserie, and an air circulation unit for recirculating hot air between the charcoal tray and the grill.

2. Description of the Related Art

The cooking of food items by the application of heated smoke from a burning fire fueled by wood has been practiced for many years. Grilling foods upon an open surface over charcoal briquets gives food a unique flavor and appearance by grilling portions of the food in contact with the grill. The art of grilling food involves a complex carmelization process which depends on many factors including length of time and intensity of applied heat.

Many earlier patents use heat transfer through radiation together with convection heating from the circulating air and conduction heating through the grill's surface in hopes to perfect the carmelization process. The achievement of uniformly cooked meat and the efficient use of fuel and energy are some continual problems associated with the operation of barbecues. Most conventional grills do not adequately allow the user a means for regulating the intensity of heat needed to properly grill foods. Reducing the temperature of the heat source can diminish the effect of radiation heat transfer and leave the user with only relatively inefficient convection heating to grill the food.

Air blowers and plenum chambers have been used in the past to force air passed a heat source to improve heat transfer efficiency, however, after the air is forced past the food product it is exhausted and no longer redistributed within the barbecue to aid in grilling process. Some barbecues described in earlier patents such as U.S. Pat. No. 4,823,684, issued to Traegar, et al. on Apr. 25, 1989 and U.S. Pat. No. 3,933,145, issued to Harry Reich on Jan. 20, 1976 are designed to direct air circulation directly through ignited briquets.

U.S. Pat. No. 5,154,159, issued to Knafelc, et al. on Oct. 13, 1992 describes a bowl shaped barbecue cooker that incorporates a briquet ignition and air blower system designed specifically to quickly and evenly ignite briquets as well as produce an even distribution of hot air across the surface of the char grill. The char grill is made of a set of upper concentric rings spanned by a plurality of parallel rods. The ignition chamber has a cylindrical shaped wall and is perforated with holes. The ignition chamber communicates with an air blower by means of perforated plenum chamber wall which distributes combustion enhancing air evenly to the surfaces of colder briquets for rapid heating.

A cranking mechanism is provided for raising heated briquets from an ignition chamber onto a char grill. The mechanism includes a housing which is unitary with a sleeve which is, in turn, rotatably mounted by extended flanges within the base cylinder. The crank and handwheel mechanism includes a conventional brake or locking device. Manipulation of the crank and wheel mechanism winds a cable around the handwheel and causes the elevator shaft and elevator platform to rise.

This prior art patent only uses its air blower system to rapidly ignite briquets. A major problem with this circulation process is that hot ashes may be distributed throughout the enclosure of the barbecue and fall onto the food being grilled. When the air blowing process has been completed, the blower system shuts down and does not have any other use. A large percentage of heat produced by the briquets is expelled below the charcoal tray which holds the briquets. Therefore, it would be desirable to have a continual circulation process designed to recirculate air from under the ignited briquets and redistribute that air to the char grill.

A further problem that relates to the crank and handwheel mechanism is it utilizes a cable. A common problem associated with most cables is the constant wear which causes breakage. Also, there are time and cost considerations concerned with replacing broken cables. A cableless crank which raises and lowers a charcoal platform to increase or decrease heat intensity would be a preferable mechanism.

U.S. Pat. No. 5,000,085, issued to Virgil Archer on Mar. 19, 1991 describes an air slot cooking device which recirculates its hot air for grilling foods. The air slot cooking device is formed from an enclosure having a bottom, side walls and a removable top. A housing abuts a side wall of the enclosure. The housing communicates fluidly with a chamber through an air flow opening. Located within the housing chamber is a blower which recirculates air throughout the enclosure.

A grill that supports food extends to all side walls of the enclosure and divides the enclosure into an operating space above the grill and a heat supplying space below the grill. A heat supplying element is mounted in the heat supplying space and above the base of the base of the enclosure. A jet curtain plate containing various slot widths is mounted in the heat supplying space of the enclosure and spaced apart and above the heat supplying element. The slots are designed to yield streams of air having different velocities at different areas of the jet curtain plate, this provides certain areas of the grill to have various cooking speeds.

After the hot air strikes and heats the food product on the grill member, the air then flows rearwardly and downwardly into the base housing return plenum. From the return plenum, the heated air is drawn into a fan impeller disposed within the base housing discharge passage. The air is drawn horizontally into the heating plenum where it traverses and absorbs heat from the heating element. To complete its recirculating path, the heated air is then directed to air slot openings in the jet curtain plate and redirected back to the grill. Although this patent recirculates hot air within the enclosure of the barbecue, it is only adapted for a heating element and not for charcoal. The advantage of briquets over other heat sources such as gas and electrically powered barbecues is that briquets create a smoke similar to wood-based fires which is needed to produce a certain flavor to cooked food.

U.S. Pat. No. 4,773,319, issued to Robert Holland on Sep. 27, 1988 describes a barbecue having a bottom surface, a heat source adjacent the bottom surface, a heat deflecting means positioned above the heat source, a grease collection and drainage system, a food supporting grill, and a hood for enclosing the housing. The heat deflector acts as a grease collector, operates to distribute heat to obviate "hot spots," and blocks undesirable flaming which causes overburning. The heat deflector/grease collector is designed with inward sloping sides that connect to form a channel for directing grease spills. Although the heat deflector plate blocks unwanted flames from directly burning the food product on the grill, the plate creates an uneven flow of heat applied to the grill.

The heat deflector plates redirects a vast amount of the heat flow around the edges of the heat plate and to the outer edges of the grill. This air flow intensifies the heat energy to the outer edges of the grill instead of an even distribution of heat over the entire grill surface. An ideal heat deflector apparatus would not only block flames directed to the grill, but allow the heat to flow through the plate and be evenly applied to the entire grill surface. Previous patents such as U.S. Pat. No. 4,800,865, issued to Michael Setzer on Jan. 31, 1989, U.S. Pat. No. 4,658,710, issued to Hector Quet on Apr. 21, 1987, U.S. Pat. No. 4,418,615, issued to Michael Higgins on Dec. 6, 1983, and U.S. Pat. No. 4,209,006, issued to Stephen Marsalko on Jun. 24, 1980 do not recirculate its hot air because heat escapes through chimneys mounted in the barbecue's hood.

U.S. Pat. No. 2,968,301, issued to Robert Cowart on Jan. 17, 1961 is a barbecue having a front wall, a back wall, and side walls. The front wall is provided with an opening into an oven chamber in the cabinet and a door opening into fire pit chambers. A grill is situated in the interior of the cabinet between the oven and the fire pit chambers. The barbecue also has an adjustable fire lift secured by a vertical adjustable fire pin designed for raising and lowering a fire pan. The fire lift affords a means for lowering the fire pan beneath the grill whereby any flames arising from the fat drippings will not damage the food product being cooked. Although this fire lift system is cableless, this prior art was designed for industrial sized fire pits. The lift system described in this prior art may operate too slow in lowering the lift because fat drippings rapidly fuel flames that quickly strike upwards towards the grill and may cause food to be burnt. An ideal barbecue would not burn food products on its grill.

A barbecue should contain a design feature that recirculates hot air within its enclosure to conserve fuel and energy. A fire screen should be included to allow an even distribution of heat to the entire grill surface and deflects uncontrollable flames fueled by fat drippings. An apparatus that would allow the barbecuer to monitor the temperature inside the barbecue at all times and a device that operates to exhaust hot air when the temperatures inside the enclosure is to high.

None of the above inventions and patents, taken either singularly or in combination, is seen to describe the instant invention as claimed. Thus a turbo-charcoal barbecue solving the aforementioned problems is desired.

SUMMARY OF THE INVENTION

The turbo-charcoal barbecue is designed with five main features; a detachable turbo-unit, an adjustable rotisserie unit, a moveable charcoal tray, removable ash trays, and fire screen. The barbecue is made up of a lid, a detachable side housing unit, and a bottom pit. The bottom pit is further divided into a larger upper chamber and a small lower chamber. The entire barbecue is elevated at a convenient working height and is supported by legs and wheels for portability.

The detachable turbo unit is positioned to recirculate hot air from underneath the charcoal tray and redistribute the hot air to the upper and lower areas of the grill surface, and to the rotisserie shaft. The turbo unit is powered by a small electric motor which receives its source of power from a 12 volt battery or an electrical outlet using a transformer located on the bottom shelf of the barbecue. The turbo unit has a rotating fan that pulls hot air from underneath the charcoal tray, then the fan propels the hot air upward to the upper and lower surfaces of the grill. An adjustable hot air flow vent allows the flow of hot air to be simultaneously directed at the rotisserie shaft. A sheet of wire mesh is attached to the inside of the back wall and positioned to cover the hot air intake opening. The turbo housing unit is detachable from the back outside wall and can be easily dismantled for remote cleaning purposes. The turbo unit also includes an adjustable vent located above the fan which can be rotated or turned to manipulate the flow of hot air in a desired direction. The vent can be positioned parallel to the grill or upwards in the direction of a rotisserie ensemble.

The turbo-charcoal barbecue includes an adjustable rotisserie ensemble which is also driven by a 12 volt motor or from an electrical outlet using a transformer. The rotisserie shaft sits in a guide mechanism located on the left and right side walls of the barbecue lid. The mechanism for adjusting the height of the rotisserie shaft operates by a male/female guide with fine toothed slots. Screws operate to loosen, adjust, and tighten the rotisserie shaft to the guide.

A charcoal tray is located beneath the fire screen and operates in several ways. The charcoal tray sits on a plate which is attached to a crank shaft mechanism used for raising and lowering the charcoal tray. The charcoal tray can also slide out of the barbecue's side wall via a trap door to replenish briquets.

A fire screen is located between the grill and the charcoal tray. The fire screen blocks and evenly spreads the flash fires under the screen, preventing the food from being burned or blackened instantly. The fire screen is rectangular in shape and contains small holes spaced evenly apart from each other designed to both block flash flames and allow the heat produced from the ignited briquets to flow through it.

Located in the lower barbecue pit are removable ash trays that collect ashes that fall out of the charcoal tray and deposit on the upper chamber floor. The upper chamber floor has two rectangular shaped openings that guide ashes down chutes into the lower chamber. The ash trays can then be pulled out of the barbecue for remote cleaning.

The turbo-charcoal barbecue has a thermostat positioned in the top of the lid's surface to allow the users to monitor the temperature of the hot air inside the barbecue enclosure. A glass window is located in the front of the lid to allow the user to monitor the food being cooked without having to lift the lid, preventing unnecessary hot air from escaping the enclosure. A rectangular slot having a cover is located on the side wall of the lid. The cover can be slid open to release some of the hot air inside. A timer is located beneath a side table and accessible to the user from the front of the barbecue.

Accordingly, it is a principal object of the invention to provide a turbo-charcoal barbecue that will uniformly cook meat and make efficient use of the fuel and energy.

It is another object of the invention to provide a turbo-charcoal barbecue that allows the user to easily replenish briquets into the charcoal tray.

It is a further object of the invention to provide a turbo-charcoal barbecue that allows the intensity of heat can be controlled by moving the charcoal tray up and down or by adjusting the opening of a heat slot.

Still another object of the invention is to provide a mechanism for monitoring the temperature within the barbecue's enclosure and affording a means to temporarily exhaust unwanted heat.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
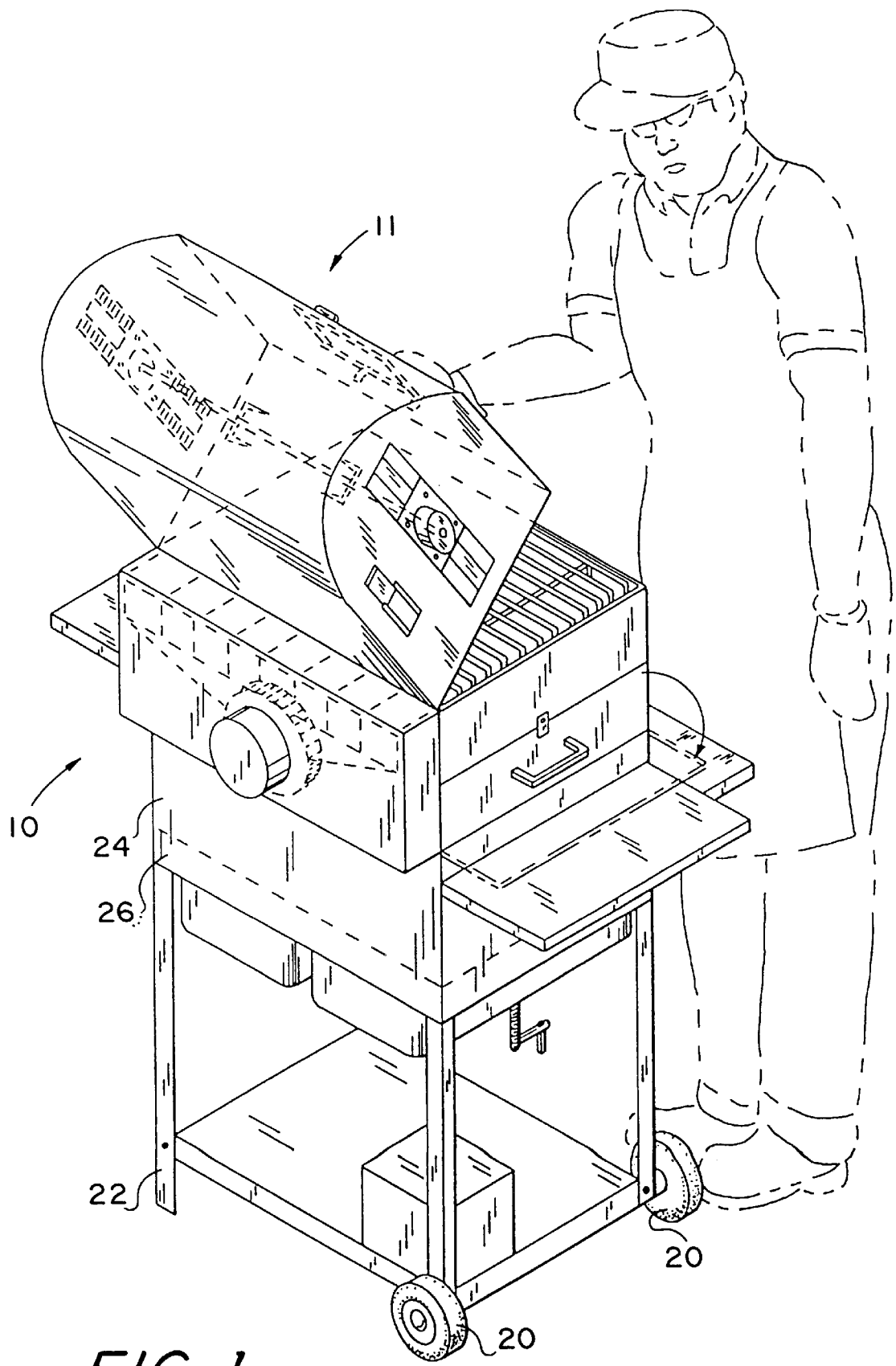
FIG. 1 is an environmental, perspective view of a turbo-charcoal barbecue according to the present invention.
Figure 2:
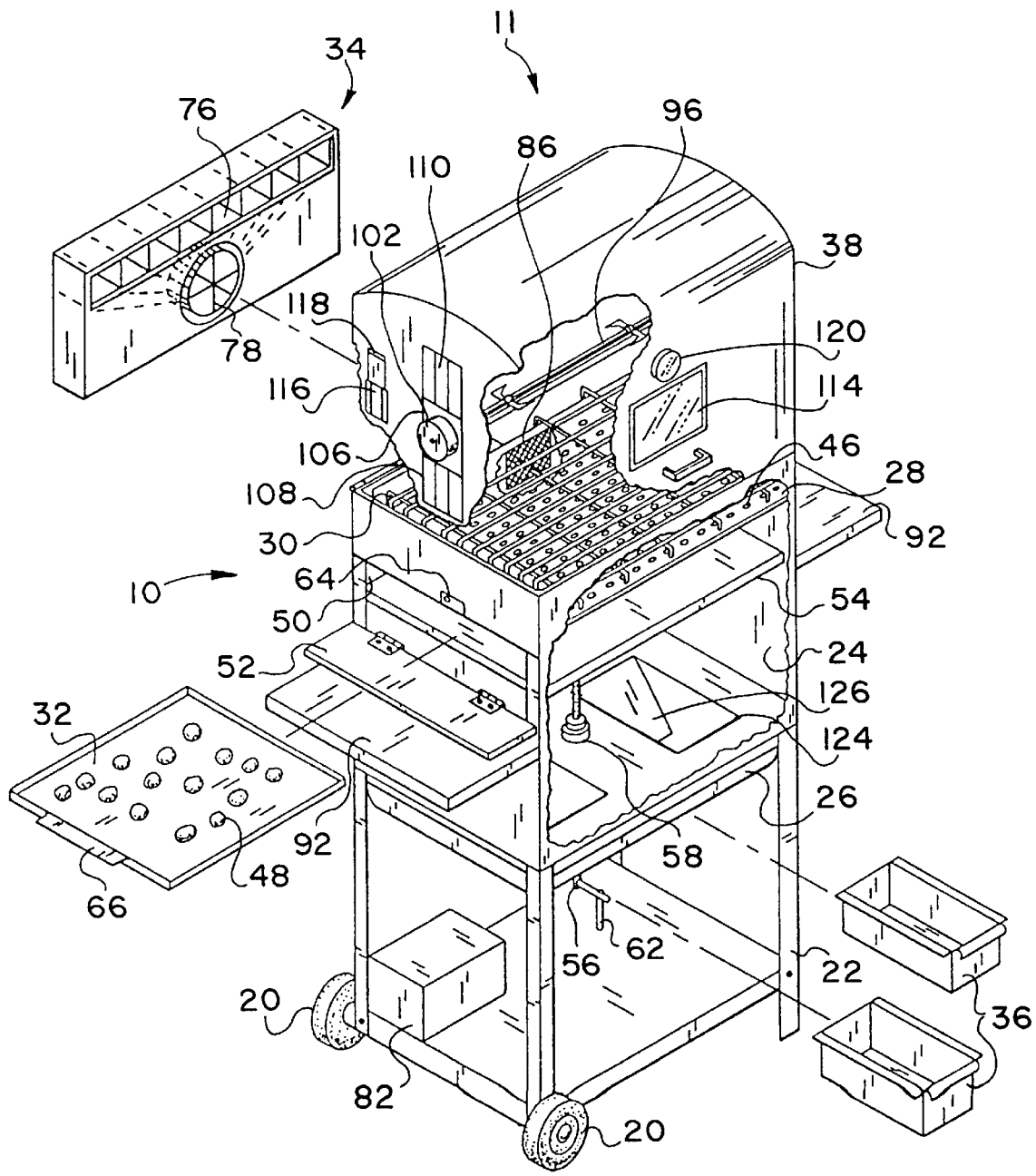
FIG. 2 is a partially exploded, perspective view of the turbo-charcoal barbecue.

The present invention is a turbo-charcoal barbecue, designated as 10 in the drawings. FIG. 1 shows a turbo-charcoal barbecue comprising an enclosure 11 most preferably constructed of heat resistant materials. The enclosure 11 is supported by two wheels 20 and two legs 22 for portability. As shown in FIG. 2 the enclosure comprises a larger upper chamber 24 containing a flame blocking and heat flow regulating fire screen 28, a grill 30, and an adjustable and removable charcoal tray 32 that can be raised or lowered by a crank shaft system. A housing 34 abuts the back of the upper chamber 24 and contains a turbo unit 40 within its structure. The enclosure also comprises a smaller lower chamber 26 for collecting expended ash material. Beneath the lower chamber 26 is two removable ash trays 36. A lid or cover 38 makes up the top portion of the enclosed structure and contains a rotisserie ensemble.

The larger upper chamber 24 contains a grill 30 that supports food and the grill 30 extends to all walls of the enclosure. FIG. 4 shows how the grill 30 divides the upper chamber 24 into an operating space 42 and a hot air flow space 44. The upper chamber 24 in FIG. 3 contains a fire screen 28 that is rectangular in shape and sits on ledges attached to the back wall and both side walls. The grill 30 is located above the fire screen 28 and is attached to the walls of the enclosure in the same fashion. The fire screen 28 stops an inch or two short of attaching to the front wall of the enclosure to leave a space allowing hot air to flow downwards. The fire screen 28 in FIG. 2 is perforated with small holes 46 designed to allow hot air through the fire screen 28 and block undesired flash flames caused by ignited briquets 48. The small holes 46 are sized to allow even heating across the entire grill 30. There is no need for a grease collector because fat drippings that come in contact with the hot fire screen 28 dissipate. The fire screen 28 can be removed for remote cleaning purposes. Previously patented flame blocking structures redirect a vast amount of the heat flow around the edges of the heat plate and to the outer edges of the grill. The fire screen not only blocks flames directed to the grill, but allows the heat to flow through the plate and be evenly applied to the entire grill surface.

Figure 3:
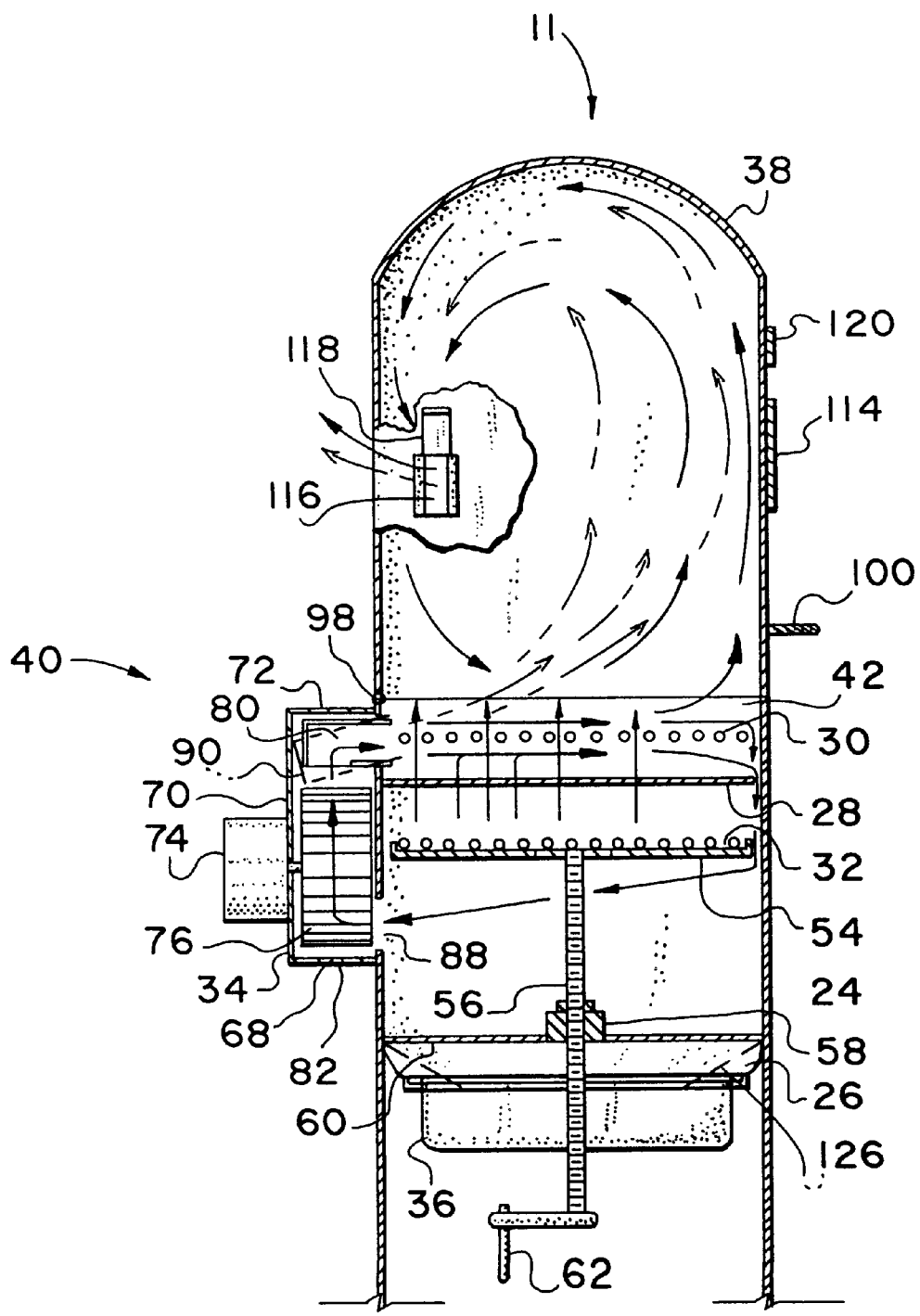
FIG. 3 is a side view of the present invention illustrating the air flow.
Figure 4:
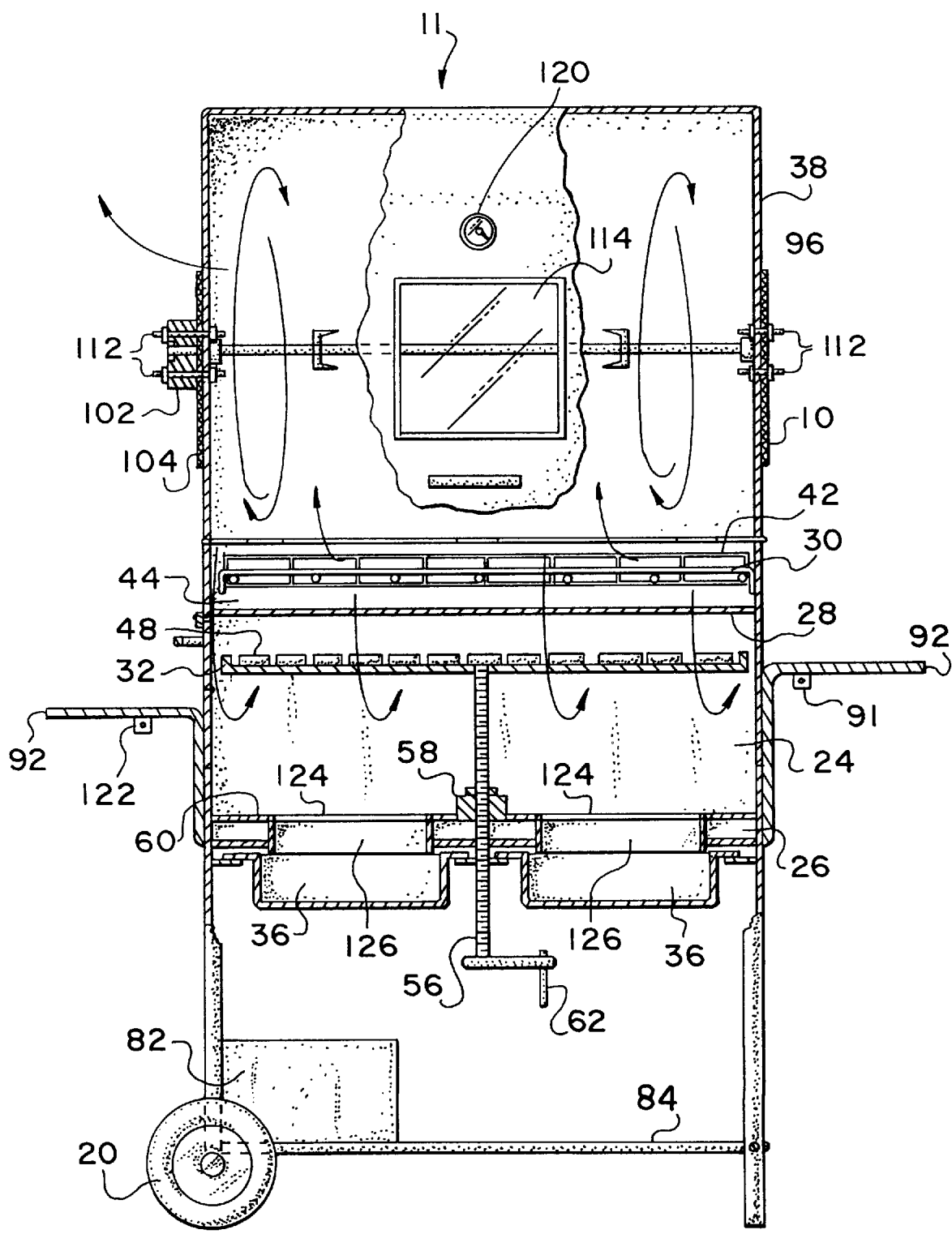
FIG. 4 is a front view of the present invention illustrating the air flow.

The upper chamber 24 in FIG. 3 contains a charcoal tray 32 that can be raised and lowered by a crank shaft system and can be removed through an opening 50 in the side wall of the enclosure via a trap door 52 to replenish briquets 48. The crank shaft system comprises a charcoal plate 54 fitted to the shape of the upper chamber 24, an elongated threaded crank shaft 56, a mount 58 attached to the floor of the upper chamber 24 and a handle 62 attached to the lower end of the crank shaft 56. The charcoal plate 54 is attached to a crank shaft 56 in a way that keeps the charcoal plate 54 from rotating but allows the charcoal plate 54 to be raised and lowered when the crank shaft 56 is turned. The top portion of the crank shaft system is located in the upper chamber 24 and extends down into the lower chamber 26 out through the bottom of the enclosure. The crank shaft 56 passes through a mount attached to the floor 60 of the upper chamber 24 which is also threaded and operates to move the shaft 56 up or down when turned. The elongated crank shaft 56 is threaded and can be turned by the crank by means of an attached handle 62.

The crank shaft system operates by movement of the crank handle 62 which causes the shaft 56 to move in the up and down position when the handle 62 of the crank 56 is turned in a clockwise or counter-clockwise direction. The charcoal tray 32 filled with ignited briquets 48 rests on the charcoal plate 54 which can be raised and lowered to control the intensity of heat source applied to the fire screen 28. Normally reducing the temperature of the heat source can diminish the effect of radiation heat transfer and leave the user with only relatively inefficient convection heating to grill the food. However, the recirculation of hot air within the enclosure improves heat transfer efficiency, even though the crank shaft has reduced the temperature of the heat source.

The crank shaft system can raise the charcoal tray 32/plate 54 complex to the opening 50 located within the side of the enclosure wall. A trap door 52 in FIG. 2 is hinged to the outside of the side enclosure wall can be opened by a latch 64 which exposes an opening 50 shaped to allow the charcoal tray 32 to be removed from the charcoal plate 54 and be slid through such opening 50. The charcoal tray 32 has a portion of one of its side wall 66 exposed to the opening 50 extending downwards from the charcoal tray 32 perpendicular to the tray's bottom.

A housing 34 abuts the back wall of the upper chamber 24 and contains a turbo unit 40 positioned in the lower section thereof. The housing 34 comprises a bottom surface 68, a back wall 70, a top wall 72 and side walls. A turbo unit 40 makes up the lower to mid section of the housing area. The turbo unit 40 comprises a motor 74 attached to the back wall 70 through an opening that rotates a fan 76 adjacent to the motor 74. The fan 76 is cylindrically shaped and has a plurality of blades 78 emanating from the center of the fan 76. The back wall 70 of the enclosure in the upper chamber 24 contains a hot air intake opening 88 shaped to the size of the fan 76, and air outlet opening 80. The turbo unit motor 74 can be operated at various speeds and the source of the power is either a battery 82 or from an electrical outlet using a transformer 82. The battery or transformer 82 is affixed to the lower shelf 84 located at the bottom of the barbecue.

Wire mesh 86 is attached to the opening 88 on the inside of the back wall 70 adjacent to the fan 76 and functions to prevent big particles of charcoal from falling into the turbo unit 40. The wire mesh 86 can be removed by sliding it up from holding brackets for remote cleaning. The wire mesh solves the problem of hot ash particles being distributed throughout the enclosure of the barbecue and from falling onto the food being grilled. A standard control switch 91 designed to adjust at variable speeds would be located beneath the side table 92 and is located at the front area of the barbecue 10 at a convenient level for the user. The control switch 91 has heat resistant wires and is connected to the turbo unit motor 74, not shown.

An adjustable hot air vent 90 system surrounds the outer edges of the rotating cylindrically shaped fan 76 and extends upwards and comprises the upper section of the housing. The back wall 70 of the enclosure in the upper chamber 24 contains a hot air output opening 80 shaped to the size of the adjustable hot air vents 90. The vent openings in the vent system 90 are designed to be positioned to expel hot air parallel to the grill 30 surface and the vent 90 can be adjusted to an upward position to expel hot air into the cover or lid 38 cavity. Normally heat is applied to meat cooked on a rotisserie shaft 96 from only the direction of the heat source. The vent system 90 in the present invention is designed to apply hot air from two directions onto the rotisserie shaft 96. By the vent 90 adjusted in the upward direction, hot air can be applied to an additional position on the rotisserie shaft 96 to allow for faster roasting.

FIGS. 3 and 4 shows a lid or cover 38 makes up the top portion of the enclosed barbecue structure and is held by hinges 98. A handle 100 would be attached to the outer surface of the front wall of the barbecue 38 lid for opening and closing the lid 38. A rotisserie ensemble is assembled above the grill 30 and attached to the side walls of the barbecue cover 38 by gripping prongs mounted thereon. The rotisserie shaft 96 is rotated by a motor 102 which may be of conventional construction and the source of power is either by a battery 82 or from an electrical outlet using a transformer 82. The rotisserie shaft 96 is adjustable in height through guides 104 mounted within both side walls of the lid 38. In FIG. 2 the guide 104 operates as a male 106 and female 108 connection that locks together by fine teeth located on each connection. The guide 104 is rectangular in shape and positioned vertically within the side walls with horizontally spaced teeth grooves on one side of both the male 106 and female 108 connections. There is a rectangular shape opening 110 within the guide 104. This opening 110 functions as the female 108 connection of the guide lock system. Attached to the ends of the rotisserie shaft 96 is a rectangular male 106 connection with matching teeth grooves spaced apart to fit together with the female 108 connection. When the grooves of the male 106 and female 108 connection are fitted together, screws 112 within the complex can be tightened and the male 106\female 108 attachment will lock into place. To adjust the height of the rotisserie shaft 96 the users would loosen the screws 112, adjust shaft 96 to desired height, then tighten screws 112.

In order for this appliance to be efficient the turbo-charcoal barbecue cover 38 must be closed at all times, except when turning or retrieving food within the enclosure. The cycle of hot air is the key to this process. This is an efficient barbecue 10 because the hot air underneath the charcoal tray 32 is utilized in the recirculation of hot air. Normally the hot air just stays underneath and is never used. FIG. 3 and 4 the path and cycle of the hot air when the vent 90 is in both the upward and downward positions.

The adjustable hot air flow vent 90 in the turbo unit 40 allows for two different methods of hot air flow for cooking food products within the turbo-charcoal barbecue 10. In FIG. 3 the first method of hot air flow, wherein the air flow vent 90 is angled upward, is shown in phantom lines. Alternatively, as illustrated in solid lines, the hot air flow vent 90 may be directed horizontally. Considering the upward-directed air flow vent 90, after the briquets 48 have been ignited, the control switch 91 for the turbo unit motor 74 would be turned to the desired speed. The turbo unit motor 74 rotates the cylindrically shaped fan 76 which draws heated air through the hot air intake opening 88 and from beneath the charcoal tray 32 where the ignited briquets 48 rest. This hot air is propelled into the adjustable hot air flow vent 90 which expels hot air through the hot air output opening 80 and towards the center of the lid 38 enclosure where the rotisserie shaft 96 would be located.

At the same time, the hot air flow emanating from above the ignited briquets 48 would be directed towards the fire screen 28 and be equally distributed through small holes 46 within the fire screen 28. As the hot air flow leaves the fire screen 28 it either goes towards the grill 30 or circulated back down beneath the charcoal tray 32 to be recirculated. The hot air flow that passes through the grill 30 is circulated around the rotisserie shaft 96 and flows together with the hot air flowing expelled from the hot air flow vent 90. With this method of hot air flow, hot air is directed towards two different areas of food being rotated on the rotisserie shaft 96 by its own motor 102.

FIG. 3 and 4 show the second method of hot air flow is shown only in solid lines and requires the hot air flow vent 90 to be adjusted in a position parallel to the grill surface 30. After the briquets 48 have been ignited, the control switch 91 for the turbo unit motor 74 would be turned to the desired speed. The turbo unit motor 74 rotates the cylindrically shaped fan 76 which draws in heated air through the hot air intake opening 88 and from beneath the charcoal tray 32 where the ignited briquets 48 rest. This hot air is propelled into the adjustable hot air flow vent 48 which expels hot air through the hot air output opening 80 towards the surface of the grill 30 and into the area between the fire screen 28 and the grill 30.

At the same time, the hot air flow emanating from above the ignited briquets 48 would be directed towards the fire screen 28 and be equally distributed through small holes 46 within the fire screen 28. As the hot air flow leaves the fire screen 28 it either goes towards the grill 30 or circulated back down beneath the charcoal tray 32 to be recirculated. The hot air flow above the grill 30 surface is circulated into the lid's 38 enclosure and recirculates back onto the grill surface 30. The hot air flowing between the grill 30 and the fire screen 28 joins with the hot air flowing from above the grill 30 and is directed downwardly beneath the charcoal tray 32 and in drawn back into the turbo unit fan 76 for recirculation. The achievement of uniformly cooked meat and the efficient use of fuel and energy would be obtained by the present invention.

A heat resistant glass window 114 in FIG. 4 is located within the front wall of the barbecue's lid 38. This functions to allow the user to monitor the food product being cooked without having to open the lid 38. By keeping the lid 38 in the closed position as long as possible, aids in the efficient use of the barbecue 10 in recirculating its hot air and not allow hot air to be exhausted. FIG. 2 shows a rectangular heat control slot 116 located within the top portion of the turbo-charcoal barbecue's lid 38 has a cover slip 118 that slides over it. The purpose of the slot 116 is to release some of the hot air inside the if heat is to high in the barbecue's 10 enclosure. Also located on the lid 38 is a thermostat 120 that indicates the intensity of the heat inside the barbecue's 10 enclosure. The thermostat, timer, heat control slot work together to aid in regulating the intensity of heat needed to properly grill foods.

There are several shelves 92 shown in FIG. 2 that extend out of the barbecue 10 and function as a table to hold items used in grilling and roasting. Each side of the barbecue 10 has a shelf 92 extending outward. One shelf 92 would be positioned on the same side and directly below the trap door 52 which functions to support the door 52 in the open position and to hold the charcoal tray 32 when removed from the opening 50. There would also be a small shelf 92 extending outwardly from the front of the barbecue 10 at a convenient working height for the user. A timer 122 would be located beneath one of the side shelves 92 and can be set to give warning sounds to indicate the length of time meat has been cooking in the barbecue.

Referring to FIG. 3, the barbecue 10 also comprises a smaller lower chamber 26 for collecting expended ash material. The lower chamber 26 of the barbecue is approximately five times smaller than the upper chamber 24. There is a metal floor 60 within the enclosure that separates the upper 24 and lower 26 chambers. Shown in FIG. 2 the metal floor 60 has right and left rectangular shaped openings 124 with downwardly sloped chutes 126 leading into the lower chamber 26. Attached beneath the lower chamber 26 is two removable ash trays 36. Ashes can be swept down the chutes 126 and the ash trays 36 may be slidingly removed for emptying out the expended ash material. Obviously, this would necessitate affixing some type of hinge means.

The turbo-charcoal barbecue 10 has two wheels 20 located on the left side for easy transport and a shelf 84 is located near the wheel to hold many items including a rechargeable battery or transformer 82 to power the turbo unit 40 and rotisserie motor 102.

It is to be understood that the present invention is not limited to the embodiment described above, but encompasses any and all embodiments within the scope of the following claims.

I claim:

1. A turbo-charcoal barbecue comprising:

an enclosure having a larger upper chamber, a smaller lower chamber, a back wall, a front wall and side walls, and a hinged top lid having a front wall, a back wall, side walls, and an upper chamber floor, said upper chamber floor having defined rectangular shaped openings with downwardly sloped defined chutes leading into the said lower chamber, said back wall having a hot air flow intake opening and a hot air flow output opening;

a housing abutting of said back wall of said enclosure, said housing communicating fluidly with said larger upper chamber through said hot air flow intake opening and said hot air flow output opening;

a turbo unit disposed within said housing, said turbo unit having hot air input means, hot air output means, and a hot air blower fan, said hot air output means including an adjustable hot air flow output vent, said hot air input means being in fluid communication with said upper chamber through said hot air flow intake opening, said hot air intake opening having wire mesh attached from the inside of said back wall, said hot air output means being in fluid communication with said upper chamber through said hot air flow output opening;

said hot air flow input opening being dimensioned and configured to conform to said blower fan; said side wall having an opening;

a means for supporting food disposed within said upper chamber;

a heat source below said means for supporting food, within said upper chamber;

a fire screen having a plurality of small holes disposed within said enclosure, said fire screen being located in said upper chamber between said means for supporting food and said heat source, said small holes within said fire screen are dimensioned and configured to allow hot air transfer passage to facilitate even heat distribution within said enclosure; said fire screen is dimensioned and configured to deflect flash flames from said heat source.

2. The turbo-charcoal barbecue according to claim 1, wherein said heat source is a charcoal tray.

3. The turbo-charcoal barbecue according to claim 1, wherein said upper chamber defines a charcoal plate supporting said heat source, and attached to an elevation means for selectively moving said charcoal plate towards and away from said means for supporting food.

4. The turbo-charcoal barbecue according to claim 1, wherein said said opening is dimensioned and configured to permit removal of said heat source.

5. The turbo-charcoal barbecue according to claim 4, wherein said opening includes a trap door that is hinged to the outside of said side wall, said trap door being dimensioned and configured to keep hot air from escaping said enclosure.

6. The turbo-charcoal barbecue according to claim 1, wherein said lid includes a rotisserie shaft supported above said means for supporting food, a guide mounted on said sides walls of said lid dimensioned and configured to allow said rotisserie shaft to be adjusted in height, a securing element extending through said guide and into engagement with said rotisserie shaft, and means for rotating said rotisserie shaft for even cooking of food.

7. The turbo-charcoal barbecue according to claim 1, further comprising at least one tray within said lower chamber communicating with said upper chamber through openings, said tray being dimensioned and configured for collection and disposal of ash.

8. The turbo-charcoal barbecue according to claim 1, wherein said lid includes a glass window within said front wall dimensioned and configured to monitoring cooking food inside said enclosure.

9. The turbo-charcoal barbecue according to claim 1, wherein said lid includes a means for monitoring temperature within said enclosure.

10. The turbo-charcoal barbecue according to claim 1, wherein said blower is detachable for remote cleaning.

11. The turbo-charcoal barbecue according to claim 1, further comprising a timer.

* * * * *